United States Patent [19]

Barker et al.

[11] Patent Number: 4,969,093

[45] Date of Patent: Nov. 6, 1990

[54] METHOD OF DATA STREAM CONSTRUCT MANAGEMENT UTILIZING FORMAT SHELLS AND SHELL FRAGMENTS

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 213,428

[22] Filed: Jun. 30, 1988

[51] Int. Cl.$^5$ .............................................. G06F 9/00
[52] U.S. Cl. .................................................. 364/900
[58] Field of Search ..................... 364/200, 300, 900

[56] References Cited

U.S. PATENT DOCUMENTS

| | | | |
|---|---|---|---|
| 4,445,795 | 5/1984 | Levine et al. | 364/300 X |
| 4,454,576 | 6/1984 | McInroy et al. | 364/200 |
| 4,710,886 | 12/1987 | Heath | 364/900 X |

Primary Examiner—Raulfe B. Zache
Attorney, Agent, or Firm—Andrew J. Dillon

[57] ABSTRACT

A method is disclosed for dynamically redefining a shell structure which includes embedded formatting, processing or resource information. The shell structure includes end user requirements necessary to process constructs within a data stream which are accessed by means of embedded tags within the data stream. Data stream clutter is reduced and end user formatting is rendered more flexible by embedding tags in the data stream to a point in one or more shells accessible by the end user's work station; however, it is often desirable to modify a particular shell for a specific application without permanently altering the shell. A formatting shell fragment is created in accordance with the present invention which includes a reference to a complete shell and a temporary modification to be applied to that shell. In a preferred embodiment of the present invention multiple formatting shell fragments may be concatenated with other formatting shell fragments and a complete shell. In this manner, a data stream may be processed by utilizing an existing shell structure which has been temporarily redefined for that purpose.

16 Claims, 6 Drawing Sheets

SHELL STRUCTURE
BEGIN SHELL SF --------- NAME = SHELL A

SHELL DESCRIPTOR SF --- ROOT NAME = SHELL A ROOT
                               CONTENT REFERENCE = TAG 10, TAG 1

SHELL CONTROL SF ----- CONTROL NAME = TAG 10
                          CONTROL PROC = PROC T 10
                          CONTROL DATA = IMAGE OBJ 1
                          NEXT CONTROL = TAG 101, TAG 1

SHELL CONTROL SF ----- CONTROL NAME = TAG 11
                          CONTROL ATTRIBUTE = ATT 1, TAG 11
                          CONTROL ATTRIBUTE = ATT 2, TAG 11
                          CONTROL DATA = TEXT OBJ 1
                          CONTROL PROC = FORMAT T OBJ 1
                          CONTROL PROC = LAYOUT T OBJ 1
                          NEXT CONTROL = TAG 111

SHELL CONTROL SF ----- CONTROL NAME = TAG 101
                          CONTROL ATTRIBUTE = ATT 1, TAG 101
                          CONTROL DATA = GRAPHICS OBJ 1
                          CONTROL PROC = PROC G OBJ 1
                          NEXT CONTROL = NIL     SHELL CONTROL SF ----- CONTROL NAME = TAG 102
                          CONTROL ATTRIBUTE = ATT 1, TAG 102
                          CONTROL ATTRIBUTE = ATT 2, TAG 102
                          NEXT CONTROL = NIL     SHELL CONTROL SF ----- CONTROL NAME = TAG 111
                          CONTROL PROC = PROC T 111
                          CONTROL DATA = IMAGE OBJ 2
                          NEXT CONTROL = NIL
END SHELL SF

*Fig. 4*

SHELL FRAGMENT
BEGIN SHELL SF ---------- NAME = FRAG A2

SHELL DESCRIPTOR SF --- ROOT NAME = FRAG A2 ROOT
                               STRUCTURE TO MODIFY = FRAG A1
                               CONTENT REFERENCE = TAG 111

SHELL CONTROL SF ----- CONTROL NAME = TAG 111
                          CONTROL PROC = PROC F A2T111
                          CONTROL DATA = IMAGE OBJ 2
                          NEXT CONTROL = TAG 1111

SHELL CONTROL SF ----- CONTROL NAME = TAG 1111
                          CONTROL ATTRIBUTE = ATT 1, TAG 1111
                          CONTROL DATA = TEXT OBJ 1
                          CONTROL PROC = FORMAT T OBJ 1
                          NEXT CONTROL = NIL
END SHELL SF

*Fig. 6*

FRAGMENT/SHELL CONCATENATION

FRAG A2

BEGIN SHELL
    -MODIFY REF<FRAG A1>
    -CONTENT REF<TAG 111>

SHELL CONTROL<TAG 111>
    -NEXT CONTROL<TAG 1111>

SHELL CONTROL<TAG 1111>
    ⋮

END SHELL

SHELL A

BEGIN SHELL
    -CONTENT REF<TAG 10, TAG 11>
    ⋮

SHELL CONTROL<TAG 10>
    -NEXT CONTROL<TAG 101, TAG 102>
    ⋮

END SHELL

FRAG A1

BEGIN SHELL
    -MODIFY REF<SHELL A>
    -CONTENT REF<TAG 11>

SHELL CONTROL<TAG 11>
    -NEXT CONTROL<TAG 102, TAG 111>
    ⋮

SHELL CONTROL<TAG 102>
    -NEXT CONTROL<TAG 1021>

SHELL CONTROL<TAG 111>
    -NEXT CONTROL = NIL
    ⋮

END SHELL

METHOD OF DATA STREAM CONSTRUCT MANAGEMENT UTILIZING FORMAT SHELLS AND SHELL FRAGMENTS

CROSS REFERENCE RELATED APPLICATION

This invention is related to U.S. Pat. Application Ser. No. 07/16533, filed Mar. 8, 1988, and assigned to the Assignee herein.

BACKGROUND OF THE INVENTION

1. Technical Field

The present invention relates in general to digital communications and in particular to the management and processing of data stream constructs in a manner which achieves meaningful and precise management of the data stream independent of the application program which generated the data stream. The invention provides a data stream architecture which allows a high degree of flexibility in passing document data, formatting information and resources from one application program to another by permitting existing shell structures containing such matters to be temporarily modified by the creation of formatting shell fragments.

2. Background Art

The management of a data stream in a digital communications network, such as a Local Area Network (LAN), or larger teleprocessing networks, presents many problems, particularly where the data streams are generated at various terminals or work stations which operate with a variety of application programs having different control characters and protocols.

As an example, consider a hypothetical teleprocessing network supporting communications between two or more end users. The end users may be an application program, a storage device or an operator at a display terminal. Serving the end users are a set of communications functions dealing with the language, including the formatting, translation and/or editing, dialogue, discipline to control data flow, transmission control including flow rate control and sequence control, and transportation, including passage of signals through a more or less complex transmission network between addressable units.

Systems Network Architecture (SNA) defines sets of communications related functions that are distributed throughout a network. It also defines the formats and protocols which relate these distributed functions to one another. An SNA network is highly transparent; i.e., any bit stream is allowed and the end users are not concerned with network topology, route selection, or media used. A session is defined as a temporary logical connection between network addressable units for an exchange of messages in accordance with a set of SNA functions devoted to that session. The SNA network thus provides sets of distributed services to facilitate dialogues between pairs of users. The SNA services are organized into layers so that functions that are logically independent may be designed, implemented and invoked independently. An end user may use concurrent sessions to communicate with other end users at multiple network addresses.

As mentioned above, an end user in an SNA network may be an application program, an operator of an input/output (I/O) device, or a storage medium. The most general form of end user is an application program. The interaction between a program and an SNA network includes data exchange and/or interchange and the occasional exchange of commands and indicators for control of SNA functions. Different application programs on an SNA network typically generate data streams unique to that program. While the SNA network architecture facilitates communication between end users and the network, if the end users are applications generating incompatible data streams, meaningful communication will not be achieved.

As utilized herein, a data stream is a collection of structured fields and is defined by the syntax and semantics of the structured fields. By syntax, what is meant is the manner in which the structured fields and parameters are grouped independently of their meaning or the manner of their interpretation and use. By semantics, is meant the meaning of the structured fields and parameters independently of their interpretation and use. The data stream is interpreted to generate a visual or conceptual entity such as a document. A document, in turn, is composed of pages, data objects, resources and commands, and is in either revision, presentation or resource data format or combination thereof.

As an example, text processing applications generate data streams which have embedded formatting and textual commands. These commands typically vary from one application program to another. Revisable/Format/Text/ Document/Content/Architecture (RFTDCA) was developed to provide for the interchange of data streams from different text processing applications and to allow for the consistent interpretation of embedded formatting and textual commands.

The International Standards Organization (ISO) has defined standards for document processing and interchange. Specifically, the Standard Generalized Markup Language (SGML), Publication 8879, and Office Document Architecture/Office Document Interchange Facility (ODA/ODIF), Publication 8613, are two such standards. SGML is a representation language for character text and may be utilized to define the specifications for publishing systems. Generic markup, that is, identification of the role of document elements rather than how to present those elements, is the basis of SGML. SGML is also used to interchange text documents, but since non-text data, such as scanned images and graphics, may coexist with text data in a document, the requirement to interchange documents containing non-text data is not totally addressed by SGML. This requirement is more appropriately handled by ODA.

ODA is a method of describing document structures and all types of text and non-text information that are to be included in a document. This structure description is referred to as an architecture, and the representation of the document is in a form suitable for interchange. The encoding of ODA for interchange is defined in a serial form which is a data stream. An ODA document can contain scanned images and graphics data as well as character text integrated into one consistent data stream.

ODA allows for control of the formatting process, not by embedding formatting commands, but rather by specifying attributes called layout and presentation directives, that are associated with objects defined by the document structure description. These directives are grouped together to form layout and presentation styles which, in turn, may be referenced by one or more objects in the document structure.

ODA styles may be local or external to a document but the interpretation of style attributes and values is explicitly controlled by the ODA standard. There is no explicit link from a point in an ODA data stream to a location in a style specification. The creator of an ODA document may augment the style specification by embedding user defined attribute names and values within the ODA object descriptions. User defined attributes specify an application dependent function that is to be applied to an ODA object during the document processing phase. This information is meaningful only within the creating application, and not interpretable by an arbitrary end user.

Interleaf, Xerox Ventura Publisher and Microsoft Word are examples of editing applications that use style sheets rather than embedded controls or commands to control formatting and layout. This method may be unwieldy, because, once properties are assigned to the content of a document, making systematic, global changes becomes tedious and difficult. Also, changes to style sheets may only be made within the application that created the document. Ventura Publisher has a strong import facility that accepts a diversity of file formats generated by text processing applications. These files are imported raw into Ventura Publisher where detailed formatting is performed as a post processing task based upon a style sheet chosen by the operator initiating the file import task. Default style sheets are filed separately in both Ventura Publisher and Microsoft Word, and may be accessed by multiple documents from within the Ventura Publisher and Microsoft Word applications. Microsoft Word documents normally contain a local style sheet which may be edited if the operator desires each document to have a different style sheet. In both applications, style sheet customization is available only from within the application program, and there are no explicit references from a point in a document to a location in the style sheet. The only end user who may modify a style sheet is an end user of either Ventura Publisher or Microsoft Word.

Moreover, the data streams produced under the ISO standards or by known application program products in general tend to be complex due to a desire to accommodate as many anticipated formatting requirements as possible. Consider, for example, a spread sheet application program. Intercell, row and column processing requirements differ with each operator. Designing an application program to handle all possible desires necessarily results in an extremely cluttered data stream. What is needed is a data stream architecture which is uncluttered and which permits compatible communication along diverse application programs in a network. More specifically, a mixed object document content architecture is preferred which allows documents to be interchanged among diverse products in order to process the data in the documents in a consistent manner. Within such a mixed object document content architecture, what is needed is a data stream standard which unburdens the data stream of the various formatting commands, thereby simplifying the data stream architecture and facilitating a more compatible document data interchange.

Recently, a system has been proposed which utilizes a shell structure which specifies how to manage and process tagged constructs or elements that are independent of the data content but may appear concurrently with the data in a data stream representation of a document created by an editor or other similar application. The shell structure is separate from the data stream, may be transmitted independently and may be stored in any form recognized by the network.

The shell structure system includes a tag element function which links constructs in a data stream by referencing named constructs in a shell structure. The named shell construct specifies the rules, relationships and formatting information either directly or indirectly that govern the processing and management of the data stream construct containing the reference. Such shell structures may be easily tailored by an end user; however, once modified, the original shell information is no longer available to the user. It is therefore obvious that a need exists for a method of easily and temporarily modifying or redefining such a shell structure without eliminating the original shell structure itself.

SUMMARY OF THE INVENTION

It is therefore one object of the present invention to provide a digital communications interchange environment wherein transmission efficiency is improved.

It is another object of the present invention to provide a digital communications interchange environment wherein transmission efficiency is improved by permitting the dynamic redefining of formatting shell structures which specify how to manage and process tagged constructs in a data stream.

It is still another object of the present invention to provide a digital communications interchange environment wherein transmission efficiency is improved by permitting the dynamic redefining of formatting shell structures which specify how to manage and process tagged constructs in a data stream, without permanently modifying the formatting shell structures.

The foregoing objects are achieved as is now described. Each formatting shell structure includes end user requirements necessary to process constructs within a data stream which are accessed by means of embedding tags within the data stream. Data stream clutter is reduced and end user formatting is rendered more flexible by embedding tags in the data stream to a point in one or more shells accessible by the end user's work station; however, it is often desirable to modify a particular shell for a specific application without permanently altering the shell. In accordance with the present invention, a formatting shell fragment is created which includes a reference to a complete shell and a temporary modification to be applied to that shell. In a preferred embodiment of the present invention, a formatting shell fragment may reference another formatting shell fragment which may reference another formatting shell fragment or a complete shell. In this manner, a data stream may be processed by utilizing an existing shell structure which has been temporarily redefined for that purpose.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
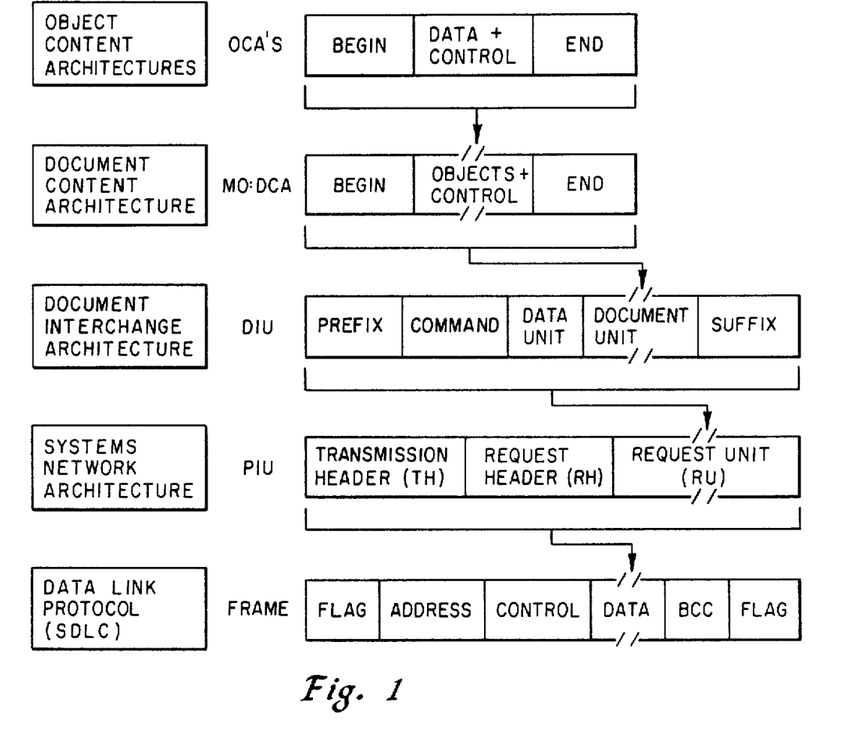
FIG. 1 is a block diagram showing the relation of the several architectures which define a data stream.

With reference now to the figures and in particular with reference to FIG. 1, there is depicted a structural overview of the several architectures which define a data stream. The first are the Object Content Architectures (OCAs) which provide the structures and controls for specific data types. Examples are revisable text OCA, which specifies tabs, margins and the like, and image OCA, which specifies resolution, compression algorithms and the like. These OCAs include data stream structures which have a begin code preceding data and control codes and are terminated with an end code.

The Document Content Architectures (DCAs), of which a specific type called Mixed Object Document Content Architecture (MO:DCA) is a preferred environment of the subject invention, provide, among other things, page layout and relations between objects. As shown in FIG. 1, the OCA data stream is included in the objects plus control part of the DCA data stream. The DCA data stream is, in turn, part of the Document Interchange Architecture which defines a Document Interchange Unit (DIU) data stream. This architecture provides document distribution services, document library services and application processing services. The data stream has a prefix followed by a command code and a data unit code. Then comes the DCA data stream as the document unit. A suffix terminates the DIU data stream.

The Systems Network Architecture (SNA), as previously described, controls exchange of information between network entities. This architecture defines a Path Information Unit (PIU) data stream which includes a transmission header, a request header and a request unit. The last of these is the DIU data stream. Finally, a data link protocol, such as Synchronous Digital Link Control (SDLC), provides synchronization and error recovery on a data link. The protocol defines a transmission frame which comprises a leading flag, an address, control bits, the data, BCC check bits for error detection, and a trailing flag. The data is the PIU data stream. The general topic of data stream definition and protocols is treated in more detail by R. J. Cypser in *Communications Architecture for Distributed Systems*, published by Addison-Wesley (1978).

Since the preferred environment for the practice of the present invention is within a mixed object document content architecture, a brief description of this architecture will be provided before describing a specific example of an implementation of the invention. Mixed Object Document Content Architecture (MO:DCA) provides a single interface definition that allows different application programs to interchange objects among each other so that this data can be edited, presented, or manipulated by processing of varying characteristics and intent. MO:DCA provides both a logical and a layout structure for the composition of a document consisting of any of the supported object types. The object types may be, for example, text objects, graphic objects, image objects, table objects, and so forth. Within a single data stream definition, MO:DCA and its data objects may specify both highly revisable and highly unrevisable constructs. Thus, the term "mixed" in MO:DCA refers to both mixed data objects and mixed document constructs. A mixed object document is the collection of resources, data objects and formatting specifications that dictate the processing functions to be performed on the document content. Each component is explicitly defined and delimited. The contents of components are other components and structured fields (i.e., commands). The structured fields in turn are composed of one or more parameters and each parameter provides one value selected from an architecture defined set of values.

Figure 2:
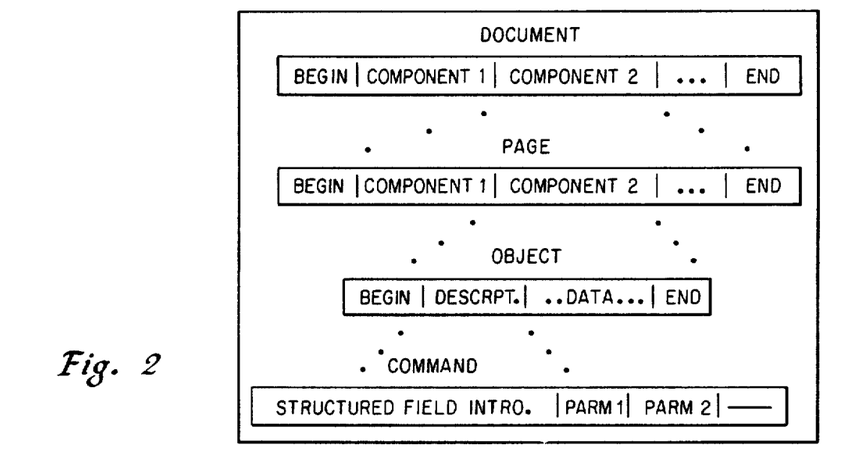
FIG. 2 is a functional block diagram illustrating the component hierarchy of a mixed object document content architecture which constitutes the preferred embodiment of the present invention.

Among the characteristics of the MO:DCA data stream and its associated object content architecture is the hierarchy illustrated in FIG. 2 of the drawings. Thus, a document is described by a data stream which comprises a document beginning code followed by a plurality of document components, here labeled components 1, 2, . . . , and ending with an document ending code. One of these document components, say component 2, might be a page which is, in turn, described by that part of the data stream which comprises a page beginning code followed by a plurality of page components, here labeled components 1, 2, . . . , and ending with a page ending code. One of these page components, say component 2, might be an object which is, in turn, described by that part of the data stream which comprises an object beginning code followed by a description of the object, the object data, and finally an object ending code. The object description is a command which is composed of a structured field introduction which may be followed by a plurality of parameters. Thus, the data stream contains an ordered nesting of objects that are made up of structured fields (i.e., commands). Moreover, multiple types of data can appear on a single page, for example, text, image, graphics, and so forth. All function and data comprising a MO:DCA data stream are grouped into logical records called structured fields. These structured fields are in effect "commands" with zero or more parameter fields. All structured fields are contained within a Begin/End pair.

Figure 3:
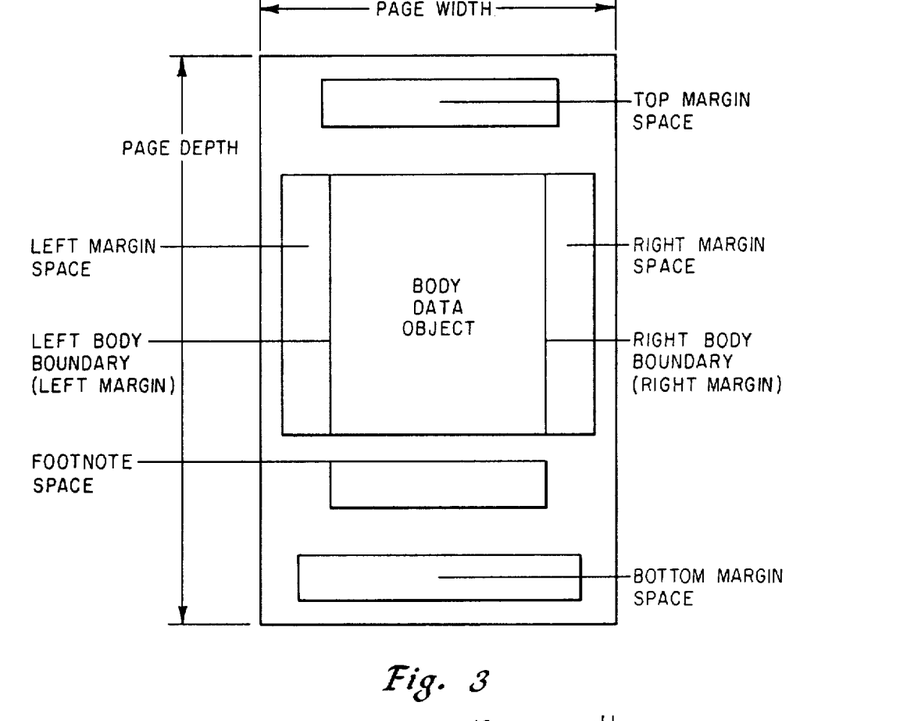
FIG. 3 is an illustration of page elements of a page within a document that are describable by a data stream.

A page of a document contains data objects that are part of a presentation or revisable document that is to be imaged according to a page model description. FIG. 3 shows an example of the page element which may be defined by a page model. Although defined by the model, not all elements need be on every page. The body data object may be of any type, text, graphics, etc., or a mixture of types. Text objects may be in single or multiple columns. A revisable document consists of data and information which directs the presentation of data. The originator does not have to specify the format separately for each section of a document; some aspects of the format can be stated once at the beginning of the document, while other aspects can be stated within the document. The revisable document can also reference resources that are to be used or included with the present document at the time it is transformed into presentation form. A presentation document defines how the data streams that represent documents to be printed or displayed are organized.

The present invention employs Tag Logical Element (TLE) structured fields in the data stream in place of formatting constructs. The TLE can be used to call macros and pass parameters. The TLE can also be used to begin and end a specific instance of a logical element. When the TLE is used to begin a logical element, e.g., a figure, it may specify one or more attributes, e.g., a frame, for the logical element and a value, e.g., a box for each attribute. A structured shell at the end user's work station is used to specify how to manage and process TLEs embedded in the data stream. The structured shell is separate from the data stream and may be generated either by the originator of the document or the end user. If generated by the originator, the shell can be transmitted independently of the data stream and stored in any form recognized by the network thereby making it accessible by any work station in the network. If generated by the end user, the shell can be stored locally for use by only the end user. The end user may also modify the shell generated by the originator to customize the shell to satisfy the end user's formatting and processing requirements.

The TLE links constructs in the data stream by referencing named constructs in the shell. The named shell construct specifies the rules, relationships, and formatting information either directly or indirectly that govern the processing and management of the data stream construct containing the reference. Additionally, the TLE is used to associate data content with the tagged construct. Explicit association is possible by providing an internal or external reference to a data object envelope that contains the desired content information, or content generating expression that describes how to determine the desired content information. Implicit association occurs when the data object envelope follows the tagged construct sequentially in the data stream. If the TLE contains a reference to a content generating expression, the associated data content may be determined by evaluating the referenced expression. The TLE can also be used to specify one or more attributes and declared values that override, the specifications in the shell for either itself or for nested tagged constructs, if the end user has not specified otherwise. In addition to format descriptors and directives, the syntax of attributes and the set of permitted attribute values can be contained directly in the shell, referenced from the shell, or referenced from the TLE. References from the shell or TLE can be to a macro, procedure, resource object, or other such construct that specifies formatting information. The constructs referenced can be contained in the same shell or in another shell, and they can include references to other constructs. References from the TLE temporarily replace their respective counterparts in the shell. The duration of the replacement equals the duration of the scope of the tagged construct. The scope of the tagged construct is determined by the hierarchical position of the referenced named construct in the shell. The shell is structured like a tree with each named construct being a mode in the tree. Nodes are nested, and the nesting level determines the scope of the named construct represented by the node.

Figure 4:
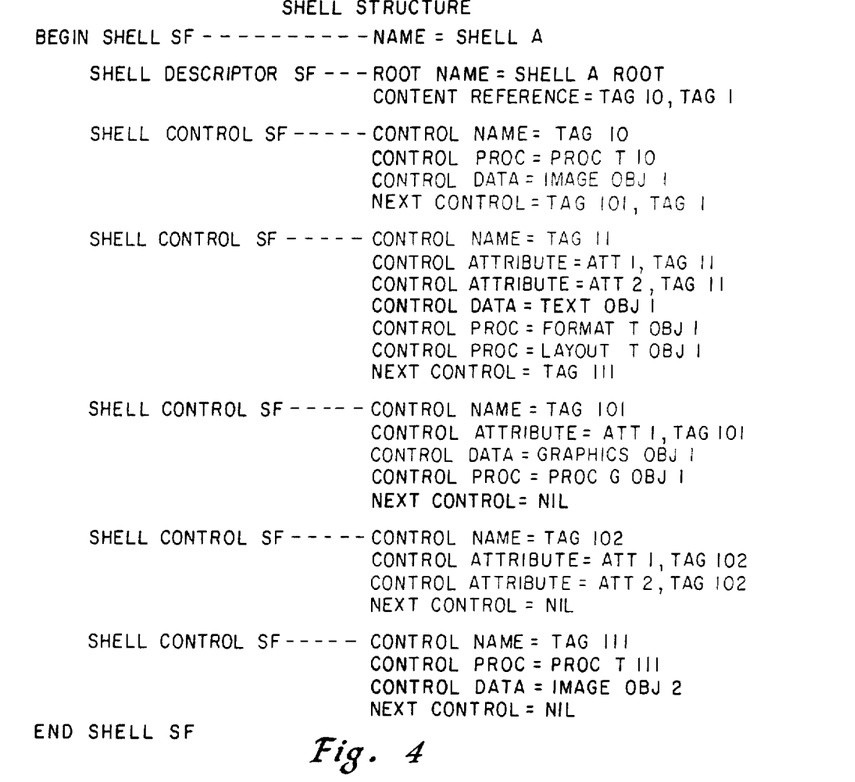
FIG. 4 is a high level depiction of a formatting shell structure.

Referring now to FIG. 4, there is illustrated a high level depiction of a formatting shell. As can be seen, the shell structure includes a shell name, root name and content reference within a structural field known as the shell descriptor. Thereafter, each shell control structural field may include in addition to a control name, control procedures, control data and a tag pointer to the next control in the shell structure. In this manner, tags within the data stream to specific sections of the shell structure may be used to govern the processing and management of the data stream portion containing the reference. The format, layout and procedures which are then to be utilized to process and manage a portion of the data stream are located within the shell structure and permit the data stream to be less cluttered and more easily managed.

Figure 5:
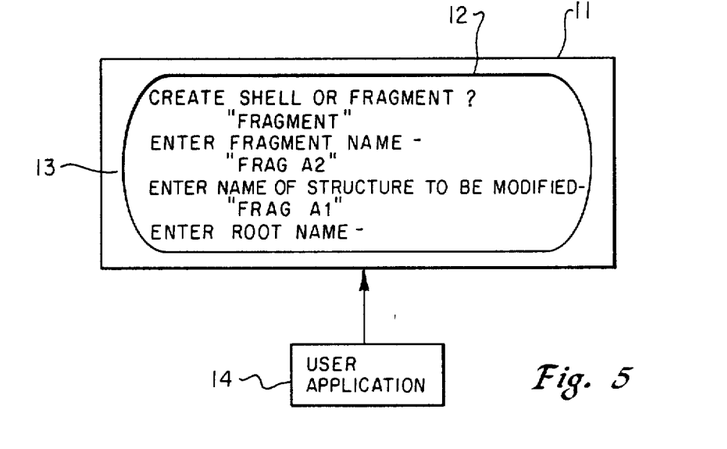
FIG. 5 is a block diagram illustrating the creation of a shell or shell fragment structure in accordance with the present invention.

With reference now to FIG. 5, there is depicted a block diagram illustrating the creation of a shell or shell fragment structure in accordance with the present invention. As can be seen, there is shown a screen 11 upon which is depicted the creation of a shell or shell fragment structure 12. The shell or shell fragment structure is being created as part of an application 13 which has been initiated by a user of a device 14 which is connected to screen 11. The application allows for the creation of a shell or shell fragment structure. Since a shell or shell fragment may be created by the depicted application, application 13 begins by polling the user to determine whether or not a shell or a shell fragment is to be created. As can be seen, after the user has elected to create a fragment, the application prompts the user to enter the fragment name. In this case, "FRAG A2" has been selected as the name of the fragment to be created.

In accordance with the present invention, the user must next enter the name of the shell fragment or shell structure to be modified by the created fragment. Each shell fragment, in accordance with the method of the present invention, contains a reference to a second shell fragment or shell structure which will be modified in accordance with the constructs contained within the created shell fragment. After the prompting statement is presented, the user inputs "FRAG A1" as the name of the structure to be modified. Thereafter, the user specifies the root name and begins to create the shell fragment specified.

As is the case with either shell structures or shell fragment structures, the user may now specify formatting directives (e.g., indent five, center, etc.), subordinate construct names and logical positional relationships, predecessor construct names, presentation attributes and defaults (e.g., Times, Roman, Font) layout information (e.g., horizontal and vertical position relative to containing named construct), or processing routines.

Figure 6:
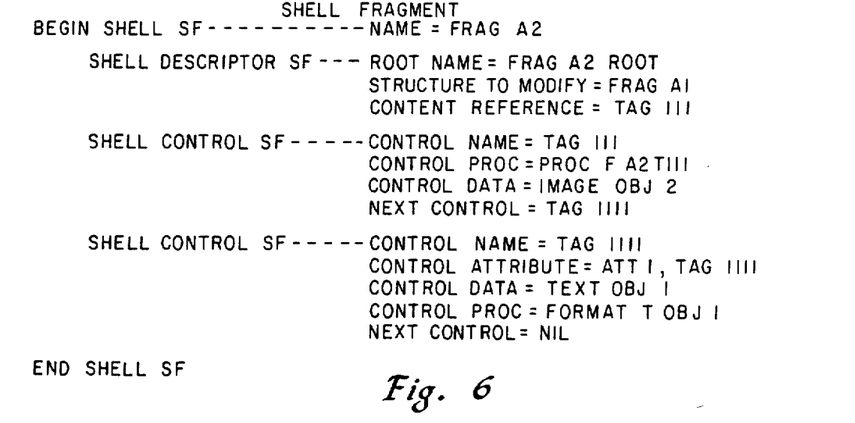
FIG. 6 is a high level depiction of a formatting shell fragment.

Referring now to FIG. 6, there is illustrated a high level depiction of a formatting shell fragment constructed in accordance with the present invention. As can be seen, the shell fragment structure includes a shell descriptor structured field which includes a reference to the name of the shell fragment or shell to be modified and the root name of the shell fragment. Additionally, the shell fragment structure includes a content reference. Thereafter, the shell fragment structure includes control names, procedures, data and references to the next control which should be utilized. It should be noted that the control names depicted in the shell fragment will be identical to control names present in other shell fragments or shell structures which are to be temporarily modified in accordance with the method of the present invention.

Figure 7:
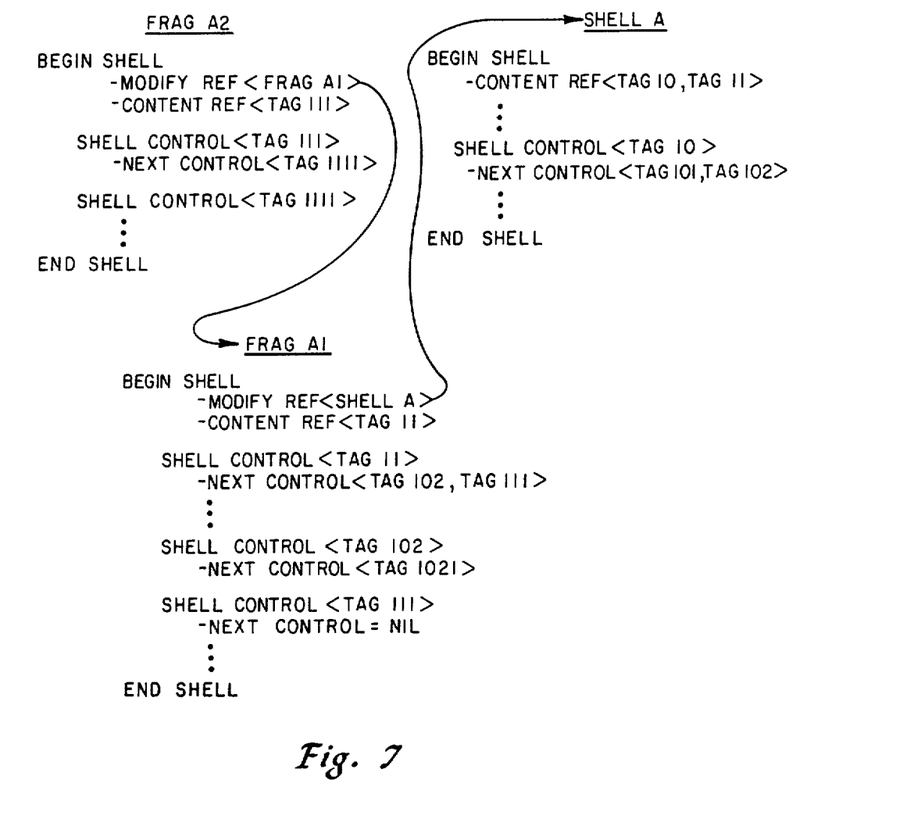
FIG. 7 is a textual illustration of the concatenation of multiple shell fragment structures and a shell structure to form a redefined shell structure.

With reference now to FIG. 7, there is depicted a textual illustration of the concatenation technique whereby multiple shell fragment structures may be combined to form a redefined shell structure for a particular data stream. As can be seen, shell fragment structure FRAG A2, when referenced by a tag within the data stream, contains a reference to shell fragment FRAG A1, indicating that it will be utilized to modify shell fragment FRAG A1.

This process will then proceed to shell fragment FRAG A1 which includes a reference to shell A. Thus, shell A will then be modified pursuant to the controls contained within shell fragment FRAG A1 and shell fragment FRAG A2. Of course, those skilled in the art will appreciate that there is no limit to the number of chained shell fragment structures which may be accomplished utilizing this technique. The precedence order of "chained" shell fragment structure definitions may be easily defined such that changes to a shell structure definition encountered first in the chain have precedence over changes to the same part of the shell structure which are encountered later in the chain.

Figure 8:
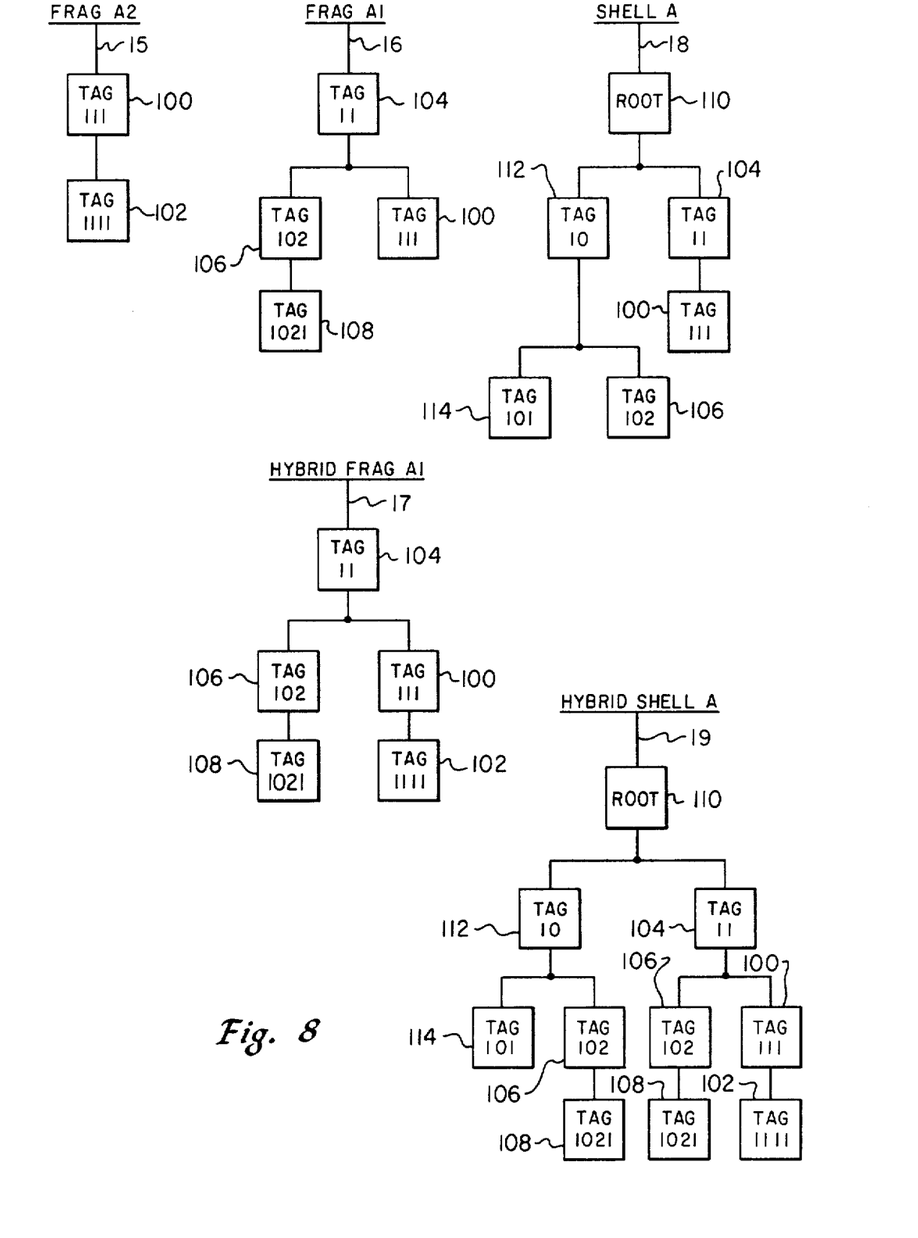
FIG. 8 is a graphic illustration of the concatenation of multiple shell fragment structures and a shell structure to form a redefined shell structure.

Referring now to FIG. 8, there is depicted a graphic illustration of the concatenation technique whereby multiple shell fragment structures and a shell structure may be combined to form a redefined or "hybrid" shell structure. As can be seen, shell fragment FRAG A2 is graphically depicted at reference numeral 15 and includes two tagged constructs, Tag 111100 and Tag 1111102. Shell fragment FRAG A1 is graphically depicted at reference numeral 16 and, as can be seen, also includes a tagged construct Tag 111100, in addition to tagged constructs Tag 11104, Tag 102106, and Tag 1021108.

By the hybridization technique disclosed herein, shell fragment FRAG A2 is concatenated with shell fragment FRAG A1 to form a hybrid shell fragment FRAG A1, as depicted at reference numeral 17. As is illustrated, the new Tag 111100 and its associated Tag 1111102 have been substituted into hybrid shell fragment FRAG A1. Next, hybrid shell fragment FRAG A1 is concatenated with shell A, which is depicted at reference numeral 18.

After a similar hybridization has occurred, the resultant hybrid shell A is depicted at reference numeral 19. As can be seen, hybrid shell A now includes those tagged constructs which have been modified pursuant to the contents of shell fragments FRAG A2 and FRAG A1. In this manner, a complex shell structure may be modified to serve a specific purpose without the necessity of creating an entirely new shell structure.

Figure 9:
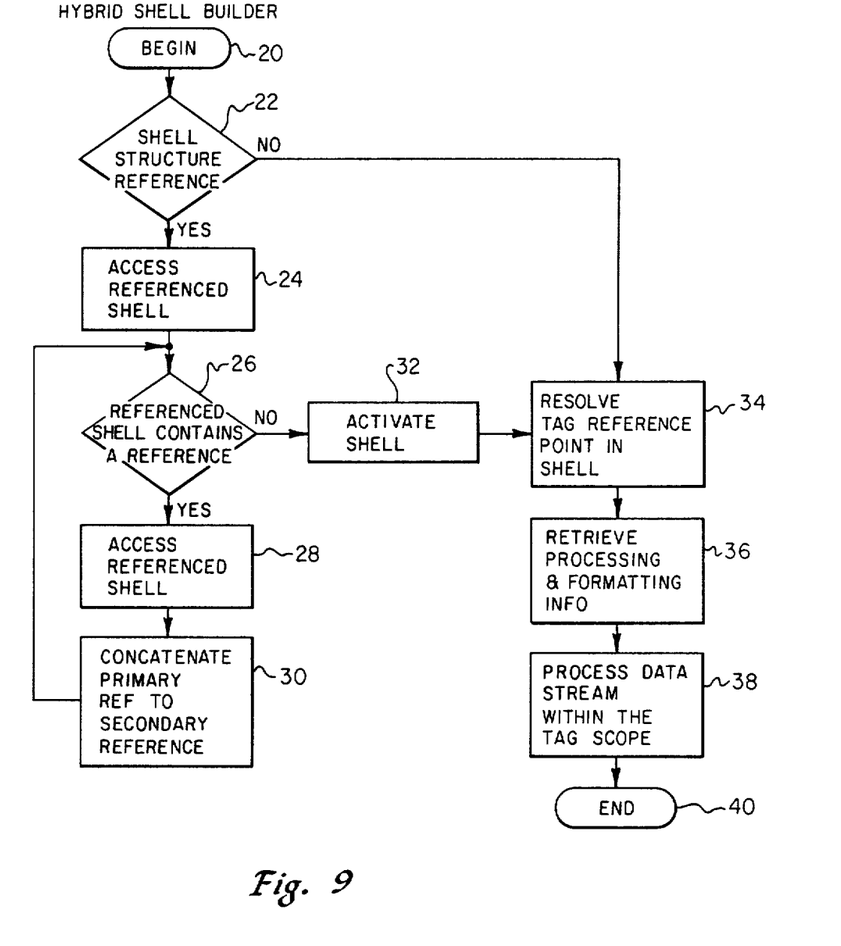
FIG. 9 is a logic flow diagram illustration of the construction of a redefined shell structure in accordance with the present invention.

Finally, with reference to FIG. 9, there is depicted a logic flow chart illustrating the construction of a redefined or hybrid shell structure in accordance with the present invention. As can be seen, after beginning as illustrated in block 20, decision block 22 is utilized to illustrate the determination of whether or not the shell or shell fragment in question contains a reference to a shell structure. If so, block 24 illustrates the accessing of the referenced shell. Next, block 26 illustrates the determination of whether or not the referenced shell or shell fragment contains a reference to a second shell or shell fragment. If so, block 28 illustrates the accessing of the next referenced shell fragment or shell structure. If not, the resultant hybrid shell is activated as shown in block 32.

At this point, the first referenced shell is concatenated to the next referenced shell, as depicted in block 30 and the program returns to block 26 to determine if an additional shell or shell fragment reference is present, requiring a second concatenation. In the event the present shell fragment or shell structure does not contain a reference to another shell, or the original shell fragment or shell structure does not contain a reference to another shell, as depicted in block 22, then block 34 depicts the resolving of the tag reference point in question within the specific shell. Next, as illustrated in block 36, the processing and formatting information contained at the referenced point within the shell is retrieved. Finally, the portion of the data stream within the tag scope is processed in accordance with the processing and formatting information thus retrieved and the program ends, as illustrated in block 40.

Accordingly, the present invention illustrates an improvement to the concept of shell structures which contain formatting, processing, and resource information which may be referenced by tag elements within a data stream by permitting the rapid and efficient modification of existing shell structures without the necessity of creating an entire shell structure. This is accomplished by the creation of a shell fragment which contains only that processing, formatting or resource information which must be modified in the existing shell. By concatenating shell fragments and shell structures in accordance with the present invention it is possible to customize a particular shell structure for a specific application without the necessity of creating an entire shell structure or modifying and eliminating an existing shell structure which may be necessarily utilized at a later date in its original form.

While the invention has been particularly shown and described with reference to a preferred embodiment, it will be understood by those skilled in the art that various changes in form and detail may be made therein without departing from the spirit and scope of the invention.

We claim:

1. A method of flexibly managing a data stream processed and transmitted in a manner which allows a high degree of flexibility by accessing a selected formatting shell by means of tags embedded in a data stream, said method comprising the steps performed by a computer of:

creating at least one formatting shell fragment having a reference therein to said selected formatting shell;
embedding at least one tag in said data stream referencing said formatting shell fragment;
accessing said at least one formatting shell fragment in response to detection of said at least one tag; and
processing said data stream in accordance with said selected formatting shell, as modified by said at least one formatting shell fragment.

2. The method according to claim 1 wherein said step of creating at least one formatting shell fragment is performed by an originator of the data stream.

3. The method according to claim 1 wherein said step of creating at least one formatting shell fragment is performed by an end user independent of the data stream.

4. The method according to claim 1 further including the step of separately transmitting said formatting shell fragment, said selected formatting shell and said data stream.

5. The method according to claim 1 further including the step of storing said formatting shell fragment in a recognizable form.

6. The method according to claim 1 further including the step of creating a second formatting shell fragment having a reference therein to said at least one formatting shell fragment.

7. A method of transmitting, managing and processing of data stream constructs independent of an application program which generated the data stream, said method comprising the steps performed by a computer of:
generating a data stream for transmission from an originating station to a receiving station;
creating at the originating station a selected formatting shell containing processing calls as part of the step of generating said data stream, said data stream having embedded therein tags to said processing calls;
creating at least one formatting shell fragment having a reference to said selected formatting shell, said formatting shell fragment having at least one processing call therein, said data stream having embedded therein at least one tag to said formatting shell fragment;
separately transmitting said data stream and said selected formatting shell to said receiving station;
processing said data stream at said receiving station to detect said tags;
retrieving processing calls identified by said tags from said at least one formatting shell fragment and said selected formatting shell; and
processing said data stream in accordance with said retrieved processing calls.

8. The method according to claim 7 wherein said step of creating at least one formatting shell fragment is performed at said origination station by an originator of said data stream.

9. The method according to claim 7 wherein said step of creating at least one formatting shell fragment is performed by an end user at said receiving station.

10. A method of managing and processing of data stream constructs in a data processing system which permits a high degree of flexibility in passing document data and formatting information from one application program to another, said method comprising the steps performed by a computer of:
using a first application program to generate a data stream describing a document, said data stream including embedded formatting tags;
separately creating a selected a selected formatting shell of processing calls, each of said processing calls linked with one of said formatting tags;
separately creating at least one formatting shell fragment including at least one processing call linked with one of said formatting tags; and
using a second application program to process said data stream by detecting said embedded formatting tags and accessing said processing calls from said selected formatting shell and said at least one formatting shell fragment.

11. The method according to claim 10 wherein said steps of separately creating a selected formatting shell and at least one formatting shell fragment are performed using said first application program.

12. The method according to claim 10 wherein said step of separately creating a selected formatting shell is performed using said first application program and wherein said step of creating said at least one formatting shell fragment is performed using said second application program.

13. The method according to claim 10 further including the step of storing said selected formatting shell and said at least one formatting shell fragment in a storage device recognized by said system and wherein said second application program accesses said processing calls from said storage device.

14. The method according to claim 10 wherein said steps of separately creating a selected formatting shell and at least one formatting shell fragment are performed using said first application program and further including the step of separately transmitting said data stream, said selected formatting shell and said at least one formatting shell fragment to said second application program.

15. A method of modifying a formatting shell structure containing a plurality of tagged constructs necessary to process portions of a data stream which are accessed by means of embedded tags within the data stream, said method comprising the steps performed by a computer of:
creating a first formatting shell fragment structure containing at least one tagged construct having an identical name to a selected one of said plurality of tagged constructs within said formatting shell structure; and
concatenating said first formatting shell fragment structure and said formatting shell structure by substituting into said formatting shell structure said at least one tagged construct for said selected one of said plurality of tagged constructs.

16. The method according to claim 15 further including the step of creating a second formatting shell fragment structure containing at least one tagged construct having an identical name to a tagged construct within said first formatting shell fragment structure and wherein said second formatting shell fragment structure is concatenated with said first formatting shell fragment structure.

* * * * *